J. LEWIS AND S. DAVIES.
INDICATOR.
APPLICATION FILED MAR. 25, 1921.

1,416,847.

Patented May 23, 1922.
3 SHEETS—SHEET 1.

Inventors
John Lewis
Samuel Davies,
By ﾠ
Atty

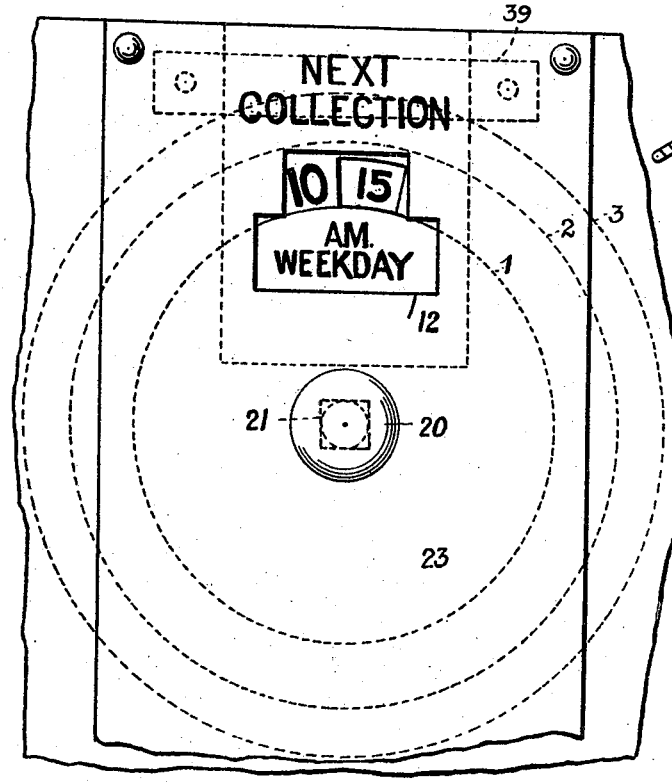
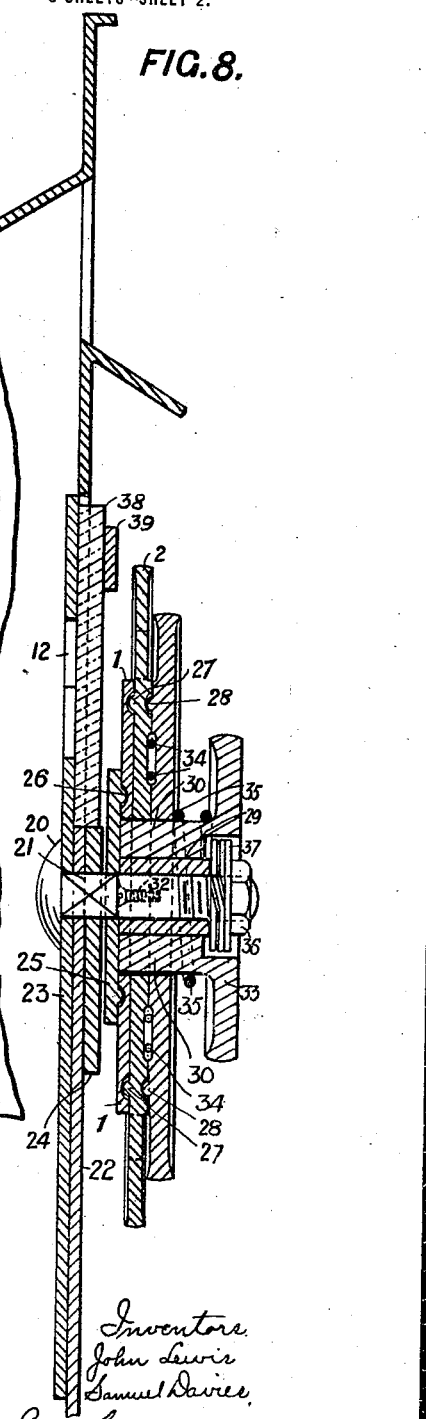
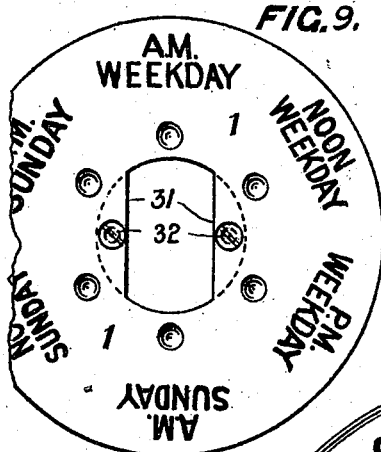
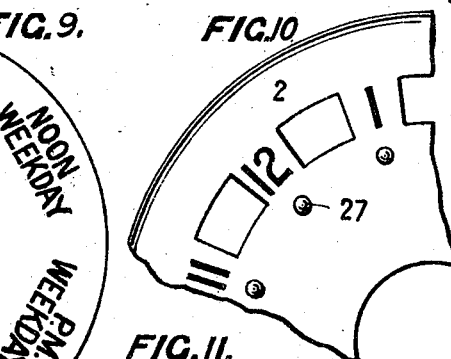
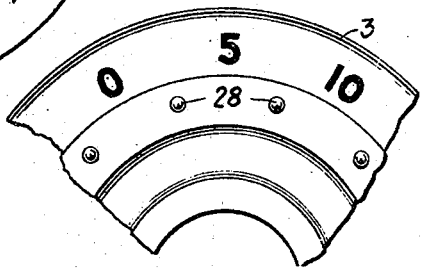

J. LEWIS AND S. DAVIES.
INDICATOR.
APPLICATION FILED MAR. 25, 1921.

1,416,847.

Patented May 23, 1922.
3 SHEETS—SHEET 3.

Inventors
John Lewis
Samuel Davies
By [signature] Atty.

UNITED STATES PATENT OFFICE.

JOHN LEWIS AND SAMUEL DAVIES, OF BRITON FERRY, WALES.

INDICATOR.

1,416,847. Specification of Letters Patent. Patented May 23, 1922.

Application filed March 25, 1921. Serial No. 455,392.

*To all whom it may concern:*

Be it known that we, JOHN LEWIS, a subject of the King of Great Britain, of Briton Ferry, in the county of Glamorgan, South Wales, and SAMUEL DAVIES, a subject of the King of Great Britain, of Briton Ferry, aforesaid, have invented certain new and useful Improvements in Indicators, of which the following is a specification.

This invention relates to improvements in and connected with indicators for application to letter-boxes (commonly called pillar boxes) shops, offices and other places.

The principal object of the invention is to provide a simple, handy and cheap indicator device, easy of application and intended to indicate the times of collecting letters from letter-boxes, the times of opening or closing of a shop or other place, the time of the intended return of an individual to his business premises or other place, and so on.

Another object of the invention is to provide an indicator comprising a series of two or more discs arranged one behind another and mounted concentrically, the discs being provided with series of characters and being formed with apertures, or of different diameters, or both, so that characters on different discs can be brought into conjunction to indicate the time of a collection, return of an individual or other desired information.

A further object of the invention is to enable said indicator to be used in conjunction with a frame, a slot in a door, or other means so as to present to view only those characters which are to be visible for the giving of the desired notice or information.

Other more specific objects of the invention are to provide a spring washer between two of the discs to ensure the necessary friction for preventing accidental displacement of any of the discs, or other suitable means may be employed, and to provide an ordinary washer between adjacent discs for spacing them apart, principally with the idea of preventing defacement by rubbing.

In order that the invention may be readily understood reference is made to the accompanying drawings in which:—

Figure 1 is a front elevation of a set of indicator discs constructed according to this invention, and Figure 2 is a central vertical section of Figure 1, Figure 3 is an elevation on a smaller scale of the back of a plate or door adapted for carrying the indicator discs, Figure 4 is a central vertical section of Figure 3 showing the indicator seen in Figures 1 and 2 suspended on the plate or door, Figure 5 is a side elevation of a modified hook device for the suspension of the indicator, Figure 6 is a front elevation of the plate with the slot for viewing the indicator, Figure 7 is a front elevation of a post box in which is mounted a modified construction of indicator and, Figure 8 is a vertical section of same, Figures 9 to 11 are front elevations of the discs used in this construction and, Figure 12 is a rear elevation of the discs and a disc or knob used as a handle for turning the front disc, and Figure 13 is an elevation of a washer formed with projections for engaging with the indicator discs in set positions.

Figure 1:
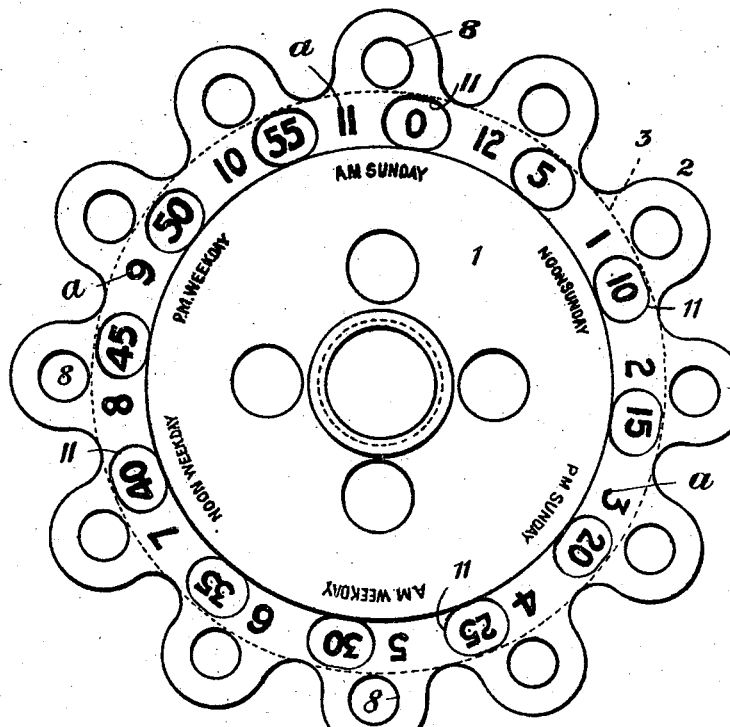
Figure 2:
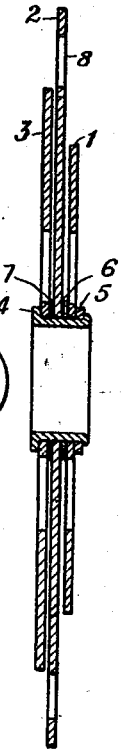
Figure 4:
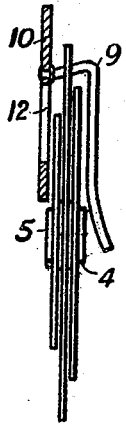
Figure 3:
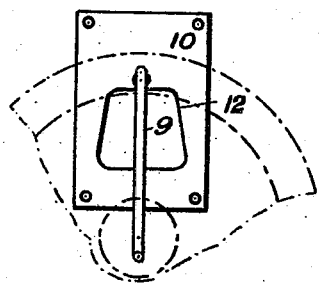
Figure 5:
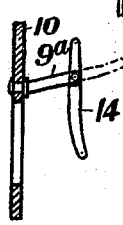
Figure 12:
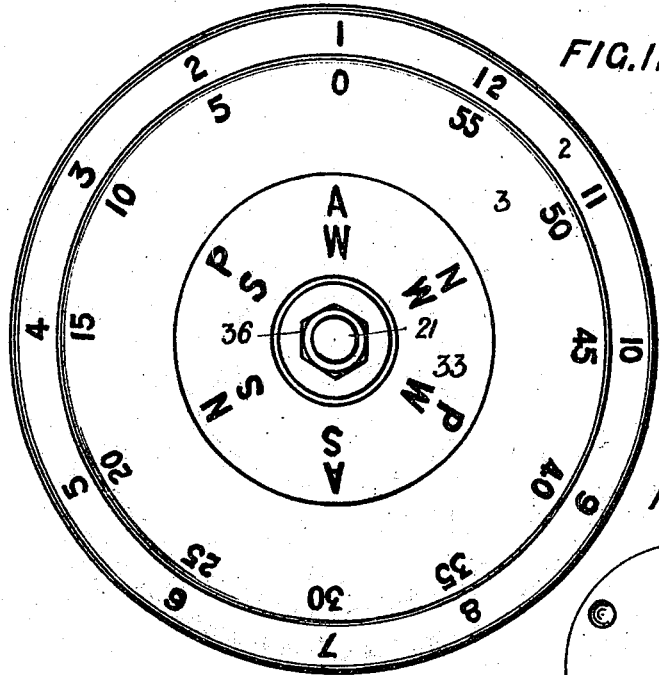

In carrying the invention into effect and according to one simple construction illustrated in Figures 1, 2, 3, 4 and 6, the indicator consists of three discs 1, 2, and 3 of different diameters mounted loosely on a stud 4, having a head at one end and a washer or collar 5 suitably secured as by riveting at the other end. Between the front disc 1, and the middle disc 2, and mounted on the stud 4 is a spring washer 6, while an ordinary washer 7, is mounted between the middle disc 2, and the rear disc 3. The middle disc 2 is furnished with a series of twelve equidistant holes 8, near its periphery and any one of these may be used for hanging the indicator on a hook or stud 9, secured to the inside of the door or plate 10 of a letter box as seen in Figures 3 and 4. The said disc 2 is also provided with a series of numerals *a*, arranged concentrically with the series of holes 8, aforesaid, the numerals *a* being the ordinals "1" to "12" inclusive to indicate the hours of the day. To the right of each ordinal is a slot 11, of such dimensions as to unmask any desired one of a series of numerals marked on the rear disc 3, and at the same radial distance as the ordinals on the middle disc 2. The rear disc 3, is intended to indicate fives of minutes, being marked, for example, with the ordinals "5", "10", "15" and so on up to and including 55 and then "0" or a blank space as desired. The front disc 1 may have a suitable number, such as four or six, of equidistant indications. In Figure 1, there are six indications as follows:—"A. M. weekdays," "Noon weekdays," "P. M. weekdays," "A. M. Sundays," "Noon Sunday," and "P. M. Sunday." These characters composing these indications may be in a straight line in each case, or, as shown concentric with the numerals, or the "A. M.", "Noon", and "P. M." may be above or below the words "Weekdays" and "Sunday" as desired. The middle disc 2, may have a scalloped or toothed peripheral formation, or may be plain. The discs 1 and 3 may be circular or they may be cut out in the form of a star or cross, if desired, to save metal or other material of which the indicator is made. The plate 10 on the door of the pillar-box is provided with a slot or opening 12, sufficiently wide and high to frame any indication which may be composed by bringing into conjunction chosen characters on the different discs. If desired, the opening may be bordered on three sides by grooved or other frame members into which a small piece of glass, preferably hardened to withstand a blow, is inserted. The indicator is hung on the hook 9, just above the aperture 12, in the door and owing to the downward extension of the hook, the indicator must be presented to the hook in a somewhat inverted position and after passing the desired aperture over the hook until it reaches the top of the hook, the indicator is then turned into proper position so that it hangs from the hook and, owing to the depending extension of the hook, cannot be displaced therefrom by accident or by any mischievous person. Or the indicator may be suspended from a stud 9ª, Figure 5, having pivoted to it a cross piece 14. If the latter is turned up to the dotted position the chosen hole of the indicator may be passed over the piece 14, and onto the hook or stud 9ª, whereupon the cross piece 14, drops to the position seen in full lines for retaining the indicator on the stud or hook.

Figure 6:
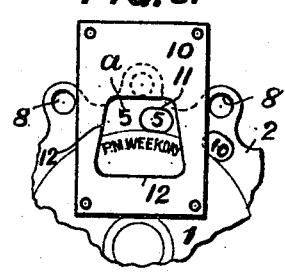

Any other means may be adopted for preventing accidental or mischievous displacement of the indicator from its suspension stud or hook. If desired, the characters, or the background surrounding them, may be painted with luminous paint or otherwise treated to render them visible in the dark and the characters may be sunk or impressed, or, if desired, they may be in relief. An indication, as seen through the slot, is illustrated in Figure 6.

The postman or other operator opens the door and collects the contents of the letter-box, but before closing the door he adjusts the indicator, by turning one or more of the disks so as to bring desired characters into conjunction to show the time of the next collection.

At the present time, it is a common practice to provide a very large number of rectangular tablets with the different times and other indications painted or enamelled thereon and the postman removes one of these tablets and replaces it by another each time he clears a letter-box. This entails a very large number of tablets, and as the times of collection are often altered for various reasons, as for example because of the alterations of times in the running of trains, many of these tablets become obsolete. In addition owing to the constant handling, the painted or enamelled indications are rubbed off, either owing to legitimate wear or they are defaced by mischievous individuals because they are generally unprotected. Moreover the tablets require to be stored at the post office, thereby occupying valuable space and a considerable amount of time is required to keep them in order to take them out and to replace them.

Now the indicator, according to this invention may be used for a considerable length of time, in fact they practically last forever, as the figures are untouched by the hand and the washers keep the discs from rubbing where they are provided with figures and indications.

Figure 13:
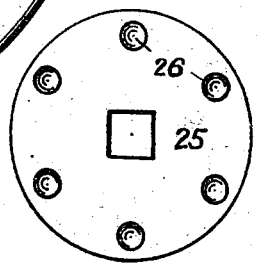

In the modification seen in Figures 7 to 13, the discs 1, 2, and 3, are revolubly arranged on a pivot or axle consisting suitably of a round headed bolt 20, having a squared portion 21, inserted through a square hole in the door 22, of the post box, and in a plate 23 bolted thereon. The square portion 21 may pass also through a square hole in a distance piece or packing plate 24 on the inner side of the door. Between the disc 1 and the plate 24 there is a washer disc 25 which may have a square hole to engage the square portion 21, of the bolt 20, or which may have a round hole so as to be revoluble on the bolt. This washer disc 25 as will be seen from Figures 8 and 13 is formed with a circular series of rounded projections 26, the number of such projections corresponding with the number of indications on the disc 1. The front face of the disc 1, is formed with a corresponding number of depressions which are similarly disposed so as to engage with the projections 26, in any one of six positions, as will be readily understood. The rear face of the disc 1, is formed with a number of depressions in a circular series and the front face of the disk 2 is formed with a similar number and disposition of rounded projections 27, the number of such projections being twelve in number which is the number of hour indications on the disc 2. The rear face of the disc 2 is formed with a similar number and disposition of depressions and the front face of the disc 3 is formed with corresponding rounded projections 28 for engaging with these depressions. Around the bolt 20, is a sleeve 29, and over this sleeve is passed a tubular hub 30, the front end of the latter being reduced by forming thereon two flats 31, Figure 9, and this reduced end fitting into a correspondingly formed hole in the disc 1, the latter being fixed to the hub 30 by two screws 32, passing through the disc 1, and into the hub 30. The rear end of the hub 30 is formed with a disc or knob 33 for turning it, and the peripheries of the discs 2 and 3, and of the disc or knob 33 may be knurled to enable them to be readily manipulated. Between the discs 2 and 3 there is arranged a spring 34, which is seated in annular grooves formed in these discs and this spring 34 tends to separate the discs 2 and 3, against the action of a stronger spring 35, arranged between the disc or knob 33, and the indicator disc 3. The stronger spring 35 tends to press all the discs 1, 2 and 3 together. Between the hub 30 and a nut 36, screwing on the end of the bolt 20 there is a spring 37 which tends to press the indicator bodily towards the front plate or door of the postbox. A slot or opening 12 is formed, as in the construction first described, for enabling the indicator to be viewed, as seen in Figure 7, and as seen in Figure 8, a plate of glass 38 may be removably inserted in a holder 39 behind the opening 12 to prevent interference with the indicator. Removal of the glass 38 by raising it, may be rendered impossible while the door is closed, by causing the upper edge of the glass to come under an overhanging part of the door frame or the like. In this construction, the rear faces of the discs 2 and 3 may be provided with indications corresponding with those on their front faces, so that the postman may see from the rear how the discs are set, and the rear face of the disc or knob 33 may bear indications similar to those on the front face of the disc 1, for a similar purpose.

In operation, the postman before closing the door of the post box, sets the disc 1, by turning the knob 33, until he sees that the "Sunday" or "Weekday" indication, as the case may be is opposite the sight opening 12. As the disc 1, is turned the depressions click past the rounded projections 26, and the said depressions and projections eventually register the disc 1, in the correct position desired. If it be then necessary to turn the disc 2, in relation to the disc 1, so as to bring a different hour into the sight opening 12, this is done by turning the disc 2, by its knurled periphery, the duplicate indications on the back of the disc 2 showing when the desired hour is in the sight opening, and the clicking of the projections 27 with the appropriate depressions ensuring correct registration of the disc 2. If, in addition a different minutes indication be desired, the disc 3 is turned and due to the fact that the spring 34, counteracts some of the pressure of the spring 35, on the disc 3, it is possible to turn the latter without disturbing the disc 2. As seen in Figure 8, a space is provided between the outer portion of the disc 3, and the disc 2, so that the former is not rubbed by the disc 2, upon that portion of its surface which bears the indications. The construction shown in Figures 7 to 13 is applicable to existing post boxes by cutting out an aperture such as indicated by dotted lines, in the door of the box and bolting on the door the plate 23.

Figure 14:
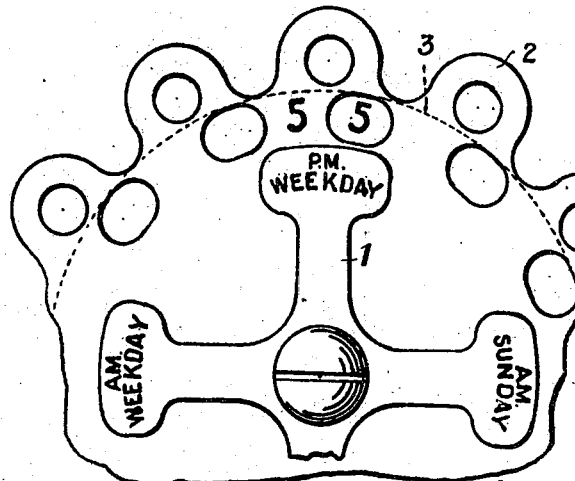
Figure 14 is a front elevation of a modified construction of indicator.
Figure 15:
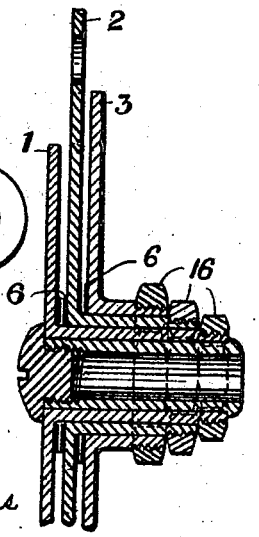
Figure 15 is a section through the axis thereof.

According to the modification, illustrated in Figures 14 and 15, the disc 1 is formed as a cross, and on respective arms of this cross are the following indications:—"A. M. Sunday", "P. M. Sunday", "A. M. weekdays", or "P. M. weekdays". Each disc of the discs 1, 2, 3 is mounted on a sleeve or hub 15, and each sleeve is furnished with a suitable head 16, or the like, the three heads 16, being arranged so that each may be manipulated without interfering with another. The outer periphery of one or all of the discs may be flanged or otherwise fashioned so that they may be easily grasped for turning. Whatever devices may be used for turning the discs it is preferred that they shall be marked on the back in a manner conforming to the marking in front, so that the postman or other operator need not look at the front of the indicator while he is setting it from the back. Naturally, the disc 1 may be formed as a star with six arms and on the two additional arms there may be the indications "Noon weekdays" and "Noon Sunday".

We claim:—

1. An indicator applicable for the purpose hereinbefore referred to, comprising a set of indicator plates arranged one behind another and rotatable relatively to one another, said plates bearing circular series of indications and being so formed that it is possible by rotating them relatively to one another, to bring desired indications into conjunction so as to thereby form a notice, and one of said plates being formed with means for suspending the indicator in definite positions for the display of the desired notice, substantially as set forth.

2. A post box or the like, fitted with means for suspending an indicator of the character set forth in claim 1 hereof, said means being adapted for preventing displacement of the indicator excepting when the door of the box is opened, substantially as set forth.

3. An indicator for a post box or the like comprising a set of indicator plates, pivotal means on the door of said box for revolubly supporting said indicator plates one behind another, said plates bearing circular series of indications and being so formed that it is possible by rotating them relatively to one another on said pivotal means, to bring desired indications into conjunction so as thereby to compose a notice, and spaced registering means operative between said plates for ensuring correct circular adjustments thereof, substantially as set forth.

4. An indicator applicable for the purpose hereinbefore referred to, comprising a set of indicator plates arranged one behind another, said plates bearing circular series of indications and being so formed that it is possible by rotating them relatively to one another to bring desired indications into conjunction so as thereby to compose a notice, and one of said plates being provided with an axial hub member upon which the other plates are removably mounted, and an operating knob on said hub member, substantially as set forth.

5. An indicator applicable for the purpose hereinbefore referred to, comprising a set of indicator discs bearing circular series of indications, a rearwardly extending cylindrical hub member on each disc, said hub members being adapted to be assembled concentrically so that one hub may be rotated about another to bring indications on said discs into conjunction to compose the desired notice, a mounting for revolubly supporting the central hub, and means in connection with said hub members to enable each disc to be rotated independently of the other discs.

6. An indicator applicable for the purpose hereinbefore referred to, comprising a set of indicator plates arranged one behind another and rotatable relatively to one another, said plates bearing circular series of indications and being so formed that it is possible by rotating them relatively to one another, to bring desired indications into conjunction so as thereby to compose a notice, spring devices between adjacent plates and a stronger spring device operative to press all the plates together, substantially as and for the purpose set forth.

7. An indicator applicable for the purpose hereinbefore referred to, comprising a series of three discs rotatable about a common axis, the front disc having a circular series of indications thereon, the intermediate disc having a circular series of alternate indications and apertures beyond the periphery of the front disc, the rear disc of smaller diameter than the intermediate disc and having circular indications adapted to be viewed through the apertures in the front disc, and means for rotating the discs independently so that the indications displayed by the discs display the desired notice as and for the purpose set forth.

8. An indicator for a post box or the like comprising in combination a bolt on the door of the said box, a washer on said bolt, a sleeve on said bolt, a tubular hub around said sleeve, a set of three indicator discs on said hub the front disc being secured thereto and the others revoluble thereon, spaced registering means operative between the discs and also between the front disc and said washer, a spring operative between the second and rear discs and a stronger spring operative between the rear disc and a disc handle formed on the rear end of said hub, said indicator discs bearing circular series of indications and certain of them being provided with slot openings so that it is possible by rotating said discs relatively to one another to unmask certain of said indications and bring desired indications into conjunction so as thereby to compose a notice, substantially as set forth.

JOHN LEWIS.
SAMUEL DAVIES.